(12) United States Patent
Ito

(10) Patent No.: US 9,100,238 B2
(45) Date of Patent: Aug. 4, 2015

(54) INFORMATION PROVIDING APPARATUS, SYSTEM, METHOD, AND PROGRAM

(75) Inventor: Chihiro Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 270 days.

(21) Appl. No.: 13/704,322

(22) PCT Filed: Jun. 23, 2011

(86) PCT No.: PCT/JP2011/064995
§ 371 (c)(1),
(2), (4) Date: Dec. 14, 2012

(87) PCT Pub. No.: WO2011/162415
PCT Pub. Date: Dec. 29, 2011

(65) Prior Publication Data
US 2013/0097231 A1    Apr. 18, 2013

(30) Foreign Application Priority Data

Jun. 24, 2010 (JP) ................................ 2010-143684

(51) Int. Cl.
*H04L 29/06* (2006.01)
*G06Q 30/00* (2012.01)

(52) U.S. Cl.
CPC .......... *H04L 29/06047* (2013.01); *G06Q 30/00* (2013.01)

(58) Field of Classification Search
CPC .............................. H04L 41/069; G06Q 30/00
USPC .......................................................... 709/203
See application file for complete search history.

(56) References Cited

U.S. PATENT DOCUMENTS

| 7,124,272 B1 * | 10/2006 | Kennedy et al. ............... 711/173 |
| 2002/0152305 A1 * | 10/2002 | Jackson et al. ................. 709/224 |

FOREIGN PATENT DOCUMENTS

| JP | 10-260955 A | 9/1998 |
| JP | 2001-282833 A | 10/2001 |

(Continued)

OTHER PUBLICATIONS

Communication dated Jun. 2, 2015 from the Japanese Patent Office in counterpart application No. 2012-521561.

*Primary Examiner* — Kristie Shingles
(74) *Attorney, Agent, or Firm* — Sughrue Mion, PLLC

(57) ABSTRACT

Disclosed is an information providing apparatus, wherein information desired by users is provided with a high-precision selection, and at low processing cost. The information providing apparatus comprises: a data storing means for storing therein utilization log data that includes a plurality of sets of a plurality of context values inputted from a user terminal upon accessing a piece of content, and one or more information selection criterion values for the piece of content; a totalizing means for totalizing frequencies of accesses to pieces of content, from the utilization log data, for each of the combinations of the values that each of the contexts can take and the values that each of the information selection criteria can take; a context-influence calculating means for calculating a coefficient of association between each of the information selection criteria and each of the contexts, from the result of the totalization conducted by the totalizing means, and outputting the result to an information providing means; and the information providing means for selecting n [h] pieces (n [h] is one or more, and h is 1 to (the aforementioned m)) of contexts in priority from those having higher association with each of m pieces (m is one or more) of information selection criteria, on the basis of the coefficient of association, and selecting, on the basis of values of the n [h] pieces of contexts (current values) inputted from one of the user terminals (a current terminal), a piece of content to be outputted to the current terminal.

16 Claims, 10 Drawing Sheets

| UTILIZATION INFORMATION PART | | | | CONTEXT DATA PART | | | CONTENT ATTRIBUTE DATA PART | | |
|---|---|---|---|---|---|---|---|---|---|
| TIME | USER | UTILIZED CONTENT | FORM OF UTILIZATION | CURRENT LOCATION | ... | TIME ZONE | PURPOSE | ... | AREA |
| 2010/2/1 9:00:01 | USER 01 | ITEM 01 | VIEWING | AREA 1 | | FROM 7 P.M. TO 8 P.M. | ALCOHOLIC BEVERAGE | | AREA 1 |
| 2010/2/1 9:00:01 | USER 02 | ITEM 02 | BOOK MARK | AREA 2 | | FROM 7 P.M. TO 8 P.M. | | | AREA 2 |
| 2010/2/2 0:00:01 | USER 01 | ITEM 03 | VIEWING | AREA 1 | | FROM 8 P.M. TO 9 P.M. | ALCOHOLIC BEVERAGE | | AREA 2 |
| 2010/2/2 0:00:01 | USER 03 | ITEM 04 | VIEWING | AREA 4 | | FROM 8 P.M. TO 9 P.M. | ALCOHOLIC BEVERAGE | | AREA 1 |
| 2010/2/2 1:00:01 | USER 04 | ITEM 03 | VIEWING | AREA 3 | | FROM 9 P.M. TO 10 P.M. | ALCOHOLIC BEVERAGE | | AREA 2 |
| : | : | : | : | : | : | : | : | : | : |

(56) References Cited

FOREIGN PATENT DOCUMENTS

| JP | 2001-306947 A | 11/2001 |
| JP | 2002-334104 A | 11/2002 |
| JP | 2004-094383 A | 3/2004 |
| JP | 2004-355075 A | 12/2004 |
| JP | 2005-084752 A | 3/2005 |
| JP | 2005-190421 A | 7/2005 |
| JP | 2006-053616 A | 2/2006 |
| JP | 2006-133914 A | 5/2006 |
| JP | 2009-129359 A | 6/2009 |
| JP | 2009-289068 A | 12/2009 |
| JP | 2010-128927 A | 6/2010 |

* cited by examiner

Fig. 3

| TIME | UTILIZATION INFORMATION PART | | | CONTEXT DATA PART | | | CONTENT ATTRIBUTE DATA PART | |
|---|---|---|---|---|---|---|---|---|
| | USER | UTILIZED CONTENT | FORM OF UTILIZATION | CURRENT LOCATION | ... | TIME ZONE | PURPOSE | ... | AREA |
| 2010/2/1 9:00:01 | USER 01 | ITEM 01 | VIEWING | AREA 1 | | FROM 7 P.M. TO 8 P.M. | ALCOHOLIC BEVERAGE | AREA 1 |
| 2010/2/1 9:00:01 | USER 02 | ITEM 02 | BOOK MARK | AREA 2 | | FROM 7 P.M. TO 8 P.M. | | AREA 2 |
| 2010/2/2 0:00:01 | USER 01 | ITEM 03 | VIEWING | AREA 1 | | FROM 8 P.M. TO 9 P.M. | ALCOHOLIC BEVERAGE | AREA 2 |
| 2010/2/2 0:00:01 | USER 03 | ITEM 04 | VIEWING | AREA 4 | | FROM 8 P.M. TO 9 P.M. | ALCOHOLIC BEVERAGE | AREA 1 |
| 2010/2/2 1:00:01 | USER 04 | ITEM 03 | VIEWING | AREA 3 | | FROM 9 P.M. TO 10 P.M. | ALCOHOLIC BEVERAGE | AREA 2 |
| ... | ... | ... | ... | ... | | ... | ... | ... |

Fig. 4

| CONTEXT | VALUE OF CONTEXT | INFORMATION SELECTION CRITERION | VALUE OF INFORMATION SELECTION CRITERION | SCORE |
|---|---|---|---|---|
| CURRENT LOCATION | AREA 1 | PURPOSE | ALCOHOLIC BEVERAGE | 12 |
| CURRENT LOCATION | AREA 2 | PURPOSE | CAFE | 21 |
| CURRENT LOCATION | AREA 3 | PURPOSE | ENTERTAINMENT | 4 |
| CURRENT LOCATION | AREA 4 | PURPOSE | DAILY MEAL | 31 |
| ⋮ | ⋮ | ⋮ | ⋮ | ⋮ |

Fig. 5

| PURPOSE / CURRENT LOCATION | ALCOHOLIC BEVERAGE | CAFE | DAILY MEAL | FIGHTING MEAL | ENTERTAINMENT |
|---|---|---|---|---|---|
| AREA 1 | 12 | 23 | 1 | 2 | 2 |
| AREA 2 | 2 | 21 | 4 | 11 | 3 |
| AREA 3 | 3 | 1 | 3 | 32 | 4 |
| AREA 4 | 24 | 3 | 31 | 22 | 4 |

Fig. 6

| CONTEXT \ INFORMATION SELECTION CRITERION | AREA | PURPOSE | RANKING |
|---|---|---|---|
| AGE | 0.2 | 0.23 | 0.34 |
| SEX | 0.2 | 0.29 | 0.3 |
| OCCUPATION | 0.1 | 0.2 | 0.3 |
| DRINKER | 0.1 | 0.3 | 0.1 |
| CURRENT AREA | 0.7 | 0.6 | 0.2 |
| NEXT PRESUMPTION AREA | 0.8 | 0.7 | 0.1 |
| TIME ZONE | 0.2 | 0.8 | 0.1 |
| DATE | 0.1 | 0.2 | 0.25 |
| WORK LOCATION | 0.4 | 0.24 | 0.1 |
| WEATHER | 0.1 | 0.1 | 0.2 |
| ⋮ | ⋮ | ⋮ | ⋮ |

Fig. 7

| CONTEXT | INFORMATION SELECTION CRITERION | DEGREE OF INFLUENCE |
|---|---|---|
| AGE | PURPOSE | 0.23 |
| SEX | PURPOSE | 0.29 |
| OCCUPATION | PURPOSE | 0.2 |
| DRINKER | PURPOSE | 0.3 |
| CURRENT AREA | PURPOSE | 0.6 |
| NEXT PRESUMPTION AREA | PURPOSE | 0.7 |
| TIME ZONE | PURPOSE | 0.8 |
| DATE | PURPOSE | 0.2 |
| WORK LOCATION | PURPOSE | 0.24 |
| WEATHER | PURPOSE | 0.1 |
| ⋮ | ⋮ | ⋮ |

TO TOTALIZING UNIT

| TIME | USER | UTILIZED CONTENT | FORM OF UTILIZATION |
|---|---|---|---|
| 2010/2/1 9:00:01 | USER 01 | ITEM 01 | VIEWING |
| 2010/2/1 9:00:01 | USER 02 | ITEM 02 | BOOK MARK |
| 2010/2/2 0:00:01 | USER 01 | ITEM 03 | VIEWING |
| 2010/2/2 0:00:01 | USER 03 | ITEM 04 | VIEWING |
| 2010/2/2 1:00:01 | USER 04 | ITEM 03 | VIEWING |
| ⋮ | ⋮ | ⋮ | ⋮ |

Fig. 12

| USER | CURRENT LOCATION | ... | TIME ZONE |
|---|---|---|---|
| USER 01 | AREA 1 | | FROM 7 P.M. TO 8 P.M. |
| USER 02 | AREA 2 | | FROM 7 P.M. TO 8 P.M. |
| USER 01 | AREA 1 | | FROM 8 P.M. TO 9 P.M. |
| USER 03 | AREA 4 | | FROM 8 P.M. TO 9 P.M. |
| USER 04 | AREA 3 | | FROM 9 P.M. TO 10 P.M. |
| ⋮ | ⋮ | ⋮ | ⋮ |

Fig. 13

| CONTENT | PURPOSE | ... | AREA |
|---|---|---|---|
| ITEM 01 | ALCOHOLIC BEVERAGE | | AREA 1 |
| ITEM 02 | | | AREA 2 |
| ITEM 03 | ALCOHOLIC BEVERAGE | | AREA 2 |
| ITEM 04 | ALCOHOLIC BEVERAGE | | AREA 1 |
| ITEM 03 | ALCOHOLIC BEVERAGE | | AREA 2 |
| ⋮ | ⋮ | ⋮ | ⋮ |

INFORMATION PROVIDING APPARATUS, SYSTEM, METHOD, AND PROGRAM

CROSS REFERENCE TO RELATED APPLICATIONS

This application is a National Stage of International Application No. PCT/JP2011/064995, filed on Jun. 23, 2011, which claims priority from Japanese Patent Application No. 2010-143684, filed Jun. 24, 2010, the contents of all of which are incorporated herein by reference in their entirety.

TECHNICAL FIELD

The present invention relates to an information providing apparatus, a system, a method, and a program.

BACKGROUND ART

A user requires different information according to the user and the user's state. Hereinafter, a context means a state of the user. When the context changes, the information required by the user changes. As a technology with which in a state in which a context changes, the information desired by the users is presumed by collecting and analyzing a record of a user behavior and the information desired by the user is provided based on a result of the presumption, the following technologies are used.

An information presentation apparatus described in patent document 1 includes a map information accumulation means, a POI (Point Of Interest) information accumulation means, a map information acquisition means, a POI information selection log management means, a POI information weighting means, and a screen output means. Operation of the information presentation apparatus will be schematically described below.

The POI information accumulation means accumulate POI information for showing stores and the like on a map. The map information acquisition means extract map information and the corresponding POI information based on a user's current position or a user's status. The POI information selection log management means manage a log of the POI information selected by the user in past times. The POI information weighting means calculate posterior probability with which each piece of POI information is selected by using a probability network model for selecting the POI information according to the user's status (season, time, and place) and perform weighting of each piece of POI information according to the posterior probability. The screen output means display the POI information ranked according to the weighting in a screen.

A content delivery system which included an in-vehicle apparatus (a content reception reproduction apparatus), a content server for delivering content, and a service server for transmitting content candidate list information which can be delivered by the content server to the in-vehicle apparatus is described in patent document 2. The in-vehicle apparatus described in patent document 2 presumes a content desired by a user, creates a time table including information on content to be delivered by the content server and a delivery time of the content, and transmits the created time table to the content server. A program for scheduling program which creates the time table in the in-vehicle apparatus selects the content. Operation of the selection will be schematically described below.

First, the program for scheduling program generates a Bayesian network with a random variable about content information (information on content, consideration, data capacity, and the like), a random variable about user information (sex, favorite genre, and the like), and a random variable about status (information on a car and information about congestion). The program for scheduling program inputs information about a content to the Bayesian network and calculates a probability distribution about the user information and the status information. The program for scheduling program determines a degree of equivalence between a result of this calculation and various information about the user and the status at the time of recommendation, and determines the content with a high degree of equivalence as the content suitable for the delivery. The content is delivered in decreasing order of the degree of equivalence.

A content providing apparatus described in patent document 3 includes a user information management unit, a behavior log management unit, a rule management unit, a status recognition unit, a process selection unit, and a content delivery unit. Operation of the content providing apparatus will be schematically described below.

When the status recognition unit of the content providing apparatus described in patent document 3 acquires input data in relation to a certain user from various information devices which can communicate with the content providing apparatus, the status recognition unit compares the input data with an information recognition rule held by the rule management unit and recognizes the user's status. When the status recognition unit acquires input data which is user information data and behavior log data that are held by a user status management unit and the behavior log management unit respectively, the status recognition unit performs the status recognition to the input data. The information recognition unit outputs a result obtained by performing the status recognition as status recognition data.

Next, the process selection unit compares information recognition data with a process selection rule held by the rule management unit and determines a type of content to be provided to the user. The process selection unit outputs a content creation request data based on the determined content type.

Based on the content creation request data outputted by the process selection unit, the content delivery unit selects, from a plurality of content creation means for creating the content, a destination to which the request is sent, and makes the destination create the content. The content delivery unit delivers the created content to a user terminal associated with the user.

An information providing system described in patent document 4 includes an information providing server and a terminal that are configured so as to be communicable with each other.

The information providing server includes a recommendation data creation unit and a recommendation data transmission unit. The recommendation data creation unit of the information providing server creates pieces of content that fits the terminal or is a favorite of the user based on the state of the settings of the terminal and content utilization frequency data of the user in the terminal that are received from the terminal. The recommendation data transmission unit transmits the pieces of the content, which are created, to the terminal.

The terminal includes a terminal state detection unit, a setting data transmission unit, a recommendation data reception unit, a frequency data update unit, a frequency data transmission unit, an order calculation unit, and a display process unit. The terminal transmits the data of the state of the settings of the terminal and the data of the utilization frequency of content to the information providing server and receives the recommendation data from the information providing server. The terminal calculates a priority order by reflecting not only a degree of favorite but also a terminal's state when content is utilized in past times, arranges the pieces of the content recommended based on the calculated priority order, and displays them.

A method in which, by excluding a context parameter to which it is determined that it does not affect value judgment criterion, the context parameter which affects a whole information selection is optimized is disclosed in non-patent document 1. In the method disclosed in non-patent document 1, a degree of influence on the value judgment criterion when a certain context parameter changes is evaluated by calculating an amount of change, when one context parameter is varied, of a discrimination plane of a user preference model constructed by the SVM (Support Vector Machine) by using the Monte Carlo method.

PRIOR ART DOCUMENT

Patent Document

[patent document 1] Japanese Patent Application Laid-Open No. 2004-355075
[patent document 2] Japanese Patent Application Laid-Open No. 2005-084752
[patent document 3] Japanese Patent Application Laid-Open No. 2005-190421
[patent document 4] Japanese Patent Application Laid-Open No. 2009-129359

Non-Patent Document

[non-patent document 1] Kenta Oku and others, "A Study of Optimization of Feature Parameters for Context-Aware Recommendation Method in Info-Plosion Era", collection of the presented papers, 70th Information Processing Society of Japan

BRIEF SUMMARY OF THE INVENTION

Problems to be Solved by the Invention

The context information useful for presuming information desired by a user cannot be known in advance by using the technology disclosed in patent documents 1 to 4. Therefore, these technologies have a problem in which there is a possibility that unnecessary information is recommended because the context that is not required to presume the information desired by the user acts as noise and it has a bad influence on the precision of the recommendation to the user. Further, these technologies have a problem in which a processing cost increases when the dimension of the number of contexts increases.

In the technology disclosed in non-patent document 1, design of feature parameters is optimized by excluding the unnecessary context feature parameter that does not affect a user taste model. In other words, in the technology disclosed in non-patent document 1, when the context feature parameter changes, the context feature parameter by which the user's taste does not greatly change is extracted and excluded. By the technology disclosed in non-patent document 1, not only the feature parameter of the context useful for presuming the parameter value desired by the user among the parameter values of the feature parameter of a specific item is not presumed but also the feature parameter is not presumed from the feature parameter of the context. Accordingly, the technology disclosed in non-patent document 1 has a problem in which information with high accuracy cannot be recommended by selectively using the context information useful for presuming information desired by the user.

The object of the present invention is to provide an information providing system which selects information desired by a user with high accuracy and provides it to the user at a low processing cost.

Means for Solving the Problems

An information providing apparatus comprises: a data storing means for storing therein utilization log data that includes a plurality of sets of a plurality of context values inputted from a user terminal upon accessing a piece of content, and one or more information selection criterion values for the piece of content; a totalizing means for totalizing frequencies of accesses to pieces of content, from the utilization log data, for each of the combinations of the values that each of the contexts can take and the values that each of the information selection criteria can take; a context-influence calculating means for calculating a coefficient of association between each of the information selection criteria and each of the contexts, from the result of the totalization conducted by the totalizing means, and outputting the result to an information providing means; and the information providing means for selecting n [h] pieces (n [h] is one or more, and h is 1 to (the aforementioned m)) of contexts in priority from those having higher association with each of m pieces (m is one or more) of information selection criteria, on the basis of the coefficient of association, and selecting, on the basis of values of the n [h] pieces of contexts (current values) inputted from one of the user terminals (a current terminal), a piece of content to be outputted to the current terminal.

An information providing system includes: an information providing apparatus comprising: a data storing means for storing therein utilization log data that includes a plurality of sets of a plurality of context values inputted from a user terminal upon accessing a piece of content, and one or more information selection criterion values for the piece of content; a totalizing means for totalizing frequencies of accesses to pieces of content, from the utilization log data, for each of the combinations of the values that each of the contexts can take and the values that each of the information selection criteria can take; a context-influence calculating means for calculating a coefficient of association between each of the information selection criteria and each of the contexts, from the result of the totalization conducted by the totalizing means, and outputting the result to an information providing means; and the information providing means for selecting n [h] pieces (n [h] is one or more, and h is 1 to (the aforementioned m)) of contexts in priority from those having higher association with each of m pieces (m is one or more) of information selection criteria, on the basis of the coefficient of association, and selecting, on the basis of values of the n [h] pieces of contexts (current values) inputted from one of the user terminals (a current terminal), a piece of content to be outputted to the current terminal; and one or more user terminals comprising: a display means for displaying information on the content selected by the information providing means.

An information providing method comprises: storing, in a data storing means, utilization log data that includes a plurality of sets of a plurality of context values inputted from a user terminal upon accessing a piece of content, and one or more information selection criterion values for the piece of content, totalizing frequencies of accesses to pieces of content, from the utilization log data, for each of the combinations of the values that each of the contexts can take and the values that each of the information selection criteria can take, calculating a coefficient of association between each of the information selection criteria and each of the contexts, from the result of the totalization conducted by the totalizing means, and selecting n [h] pieces (n [h] is one or more, and h is 1 to (the aforementioned m)) of contexts in priority from those having higher association with each of m pieces (m is one or more) of information selection criteria, on the basis of the coefficient of association, and selecting, on the basis of values of the n [h] pieces of contexts (current values) inputted from one of the user terminals (a current terminal), a piece of content to be outputted to the current terminal.

A non-transitory computer readable medium storing an information providing program which causes a computer to function as: a data storing means for storing therein utilization log data that includes a plurality of sets of a plurality of context values inputted from a user terminal upon accessing a piece of content, and one or more information selection criterion values for the piece of content, a totalizing means for totalizing frequencies of accesses to pieces of content, from the utilization log data, for each of the combinations of the values that each of the contexts can take and the values that each of the information selection criteria can take, a context-influence calculating means for calculating the coefficient of association between each of the information selection criteria and each of the contexts, from the result of the totalization conducted by the totalizing means, and outputting the result to an information providing means, and the information providing means for selecting n [h] pieces (n [h] is one or more, and h is 1 to (the aforementioned m)) of contexts in priority from those having higher association with each of m pieces (m is one or more) of information selection criteria, on the basis of the coefficient of association, and selecting, on the basis of values of the n [h] pieces of contexts (current values) inputted from one of the user terminals (a current terminal), a piece of content to be outputted to the current terminal.

Effect of the Invention

The present invention has an effect in which information desired by a user can be selected with high accuracy and provided it to the user at a low processing cost.

BRIEF DESCRIPTION OF THE DRAWINGS

FIG. 3 is a figure showing an example of utilization log data.

FIG. 4 is a figure showing an example of a totalized result obtained by calculating a total of a frequency of content utilization for each combination of a value of the context and a value of information selection criterion.

FIG. 5 is a figure showing an example of a part of totalized result in which a frequency of content utilization is shown in a matrix form, wherein the context is a "current area" and the information selection criterion is an "object".

FIG. 6 is a figure showing an example in which a degree of influence of each context on each information selection criterion is shown.

FIG. 7 is a figure showing an example in which a degree of influence of each context on each information selection criterion is shown.

FIG. 12 is a figure showing one example of context data.

FIG. 13 is a figure showing one example of content attribute data.

EXEMPLARY EMBODIMENTS TO CARRY OUT THE INVENTION

First Exemplary Embodiment

Figure 1:
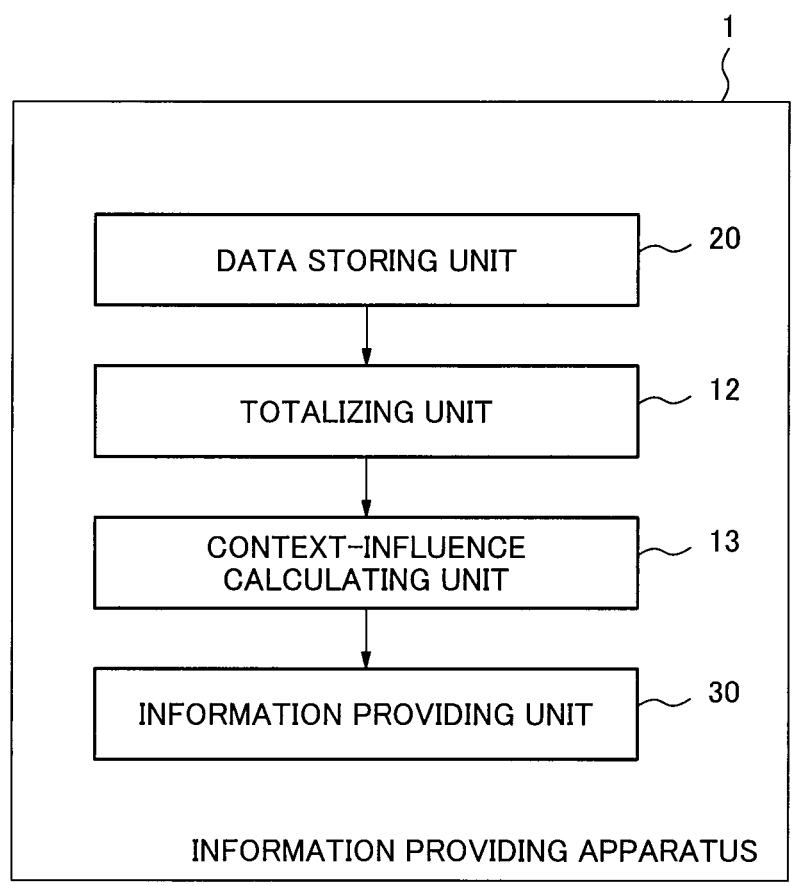
FIG. 1 is a block diagram showing a configuration of an information providing apparatus according to a first exemplary embodiment.

Next, an exemplary embodiment of the present invention will be described in detail with reference to the drawing.

FIG. 1 is a block diagram showing a configuration of an information providing apparatus according to a first exemplary embodiment.

Referring to FIG. 1, an information providing apparatus 1 of the exemplary embodiment includes a totalizing unit 12, a context-influence calculating unit 13, a data storing unit 20, and an information providing unit 30.

The data storing unit 20 stores information on a log of content utilization by a user. The information on the log of content utilization will be described as a "utilization log". The information on the log of content utilization includes information on a user's context at the time of content utilization and information on an attribute of the content utilized by the user. The information on the log of content utilization stored in the data storing unit 20 may be information on the log of content utilization by a plurality of users. It is not limited to the information on the log of content utilization by one specific user.

In the exemplary embodiment, the user's state is described by, for example, "age", "sex", "occupation", "drinker" representing whether the user is a drinker or not, "current area" representing a user location at the time of a user's access, "time zone" in which a user performs the access, "weather" at the time of a user's access, or the like. The context is a single piece of information for indicating the user's state such as "age", "sex", "occupation", "current area", or the like. A value that each context can take is one of a plurality of values corresponding to each context. For example, when the context is "sex", the value of the context is either "man" or "woman". The value of the context "sex" does not change usually but the values of some contexts such as "current area", "time zone", and the like changes every moment.

As mentioned above, the context is, for example, "age", "sex", "occupation", "drinker" representing whether the user is a drinker or not, "current area" representing a user location at the time of a user's access, "time zone" in which a user performs the access, "weather" at the time of a user's access, or the like. In the following explanation, it is assumed that the value of each context is one of a plurality values corresponding to the context. For example, it is assumed that "sex" of the user is "woman" in "man" and "woman". However, a plurality of values may be taken by one context. Further, a user whose context does not take a value may exist. In this case, as explained later, at the time of calculating a total value, with respect to the context which takes a plurality of values, the number of utilization times may be counted a plurality of times, and with respect to the context which does not take a value, the number of utilization times may be not counted. There are the contexts such as a place, a time, and the like, whose values can be represented by a continuous value. In such case, for example, when the value of the context is a place, an area having a wider area can be specified. For example, when the value of the context is a place, the value of the context may be represented by a place-name or the like by which an area having a wider area can be specified. For example, when the value of the context is time, the value of the context may be represented by a time zone, such as "from 7 p.m. to 8 p.m." or the like that shows a predetermined period.

The context is a piece of information stored in the user terminal (not shown), a value measured by a sensor included in the user terminal, or the like. The context is accumulated in the terminal or transmitted to the information providing apparatus 1 by the user terminal that performs the access at the time of accessing the content. Further, the context accumulated in the terminal is transmitted to the information providing apparatus 1 timely.

The content is information represented by, for example, a letter, an image, a voice, or the like. The content may be information that can indicate a place at which the information exists and identify the information such as URI (Uniform Resource Identifier). The content may be a combination of information represented by a letter, an image, a voice, or the like and information represented by a combination of the URLs.

The attribute of the content is a property of the content itself or a property according to the content. For example, in case the content is information on a store, a facility, or the like, a "purpose" of utilizing the store or the facility or an "area" representing a location of the store or the facility can be used for the attribute of the content. As another example of the attribute of the content, a "ranking" representing an order of a degree of popularity of the store or the facility, the number of the users, the number of browsed times of the information on the store or the facility, or the like can be used. Further, as an example of the attribute of a restaurant, for example, a "budget", a "distance from a station", or the like can be used. A type of medium of which the content is composed, for example, a content including an image, a content including a video, a content including a voice, a content including letters only, or the like may be used as the attribute of the content. Further, the presence or absence of a discount ticket, a coupon, or the like that is used at the store may be included in the attribute of the content.

The information selection criterion is a piece of information for describing the attribute of the content, such as "purpose", "area", or the like described above.

Each information selection criterion takes one of a plurality of values corresponding to the information selection criterion. For example, in case the information selection criterion is "purpose" and the values that the information selection criterion can take are "alcoholic beverage", "cafe", "daily meal", "meal before a bout", and "entertainment", "purpose" in the information selection criteria of each piece of content takes one of these values. However, one information selection criterion may take a plurality of values. If the information selection criterion which takes a plurality of values exists, the number of utilization times may be counted on the assumption in which in case the content of which the information selection criterion takes a plurality values is utilized one time, each content pieces which correspond to a plurality of values that the information selection criterion takes is utilized one time at the time of calculating a total of the number of utilization times (described later). Further, the content which has the information selection criterion having no value may exist. In this case, at the time of calculating a total, if the information selection criterion has no value, the count may be not performed (described later). In the values of the information selection criterion, the value "place" or the like that can be represented by a continuous value may be represented by, for example, a place-name or the like by which an area having a wider area can be specified.

The information on the context in the information on a content utilization log includes the value of each context of the user, who utilized the content, at the time of utilizing the content. Further, the information on the attribute of the content in the information on the content utilization log includes the value of each information selection criterion of the content utilized by the user.

Further, the data storing unit 20 does not necessarily store the information on the content utilization log as one block of data. For example, the data storing unit 20 may separately store utilization information data, context data, and content attribute data. The above-mentioned utilization information data is data including information for specifying a content utilization time and a user who utilized the content and information for specifying the utilized content. Further, the context data is data including a time and each value of the context of the user at the time. The content attribute data is data including the value of each attribute type of the content.

Figures 10, 11:
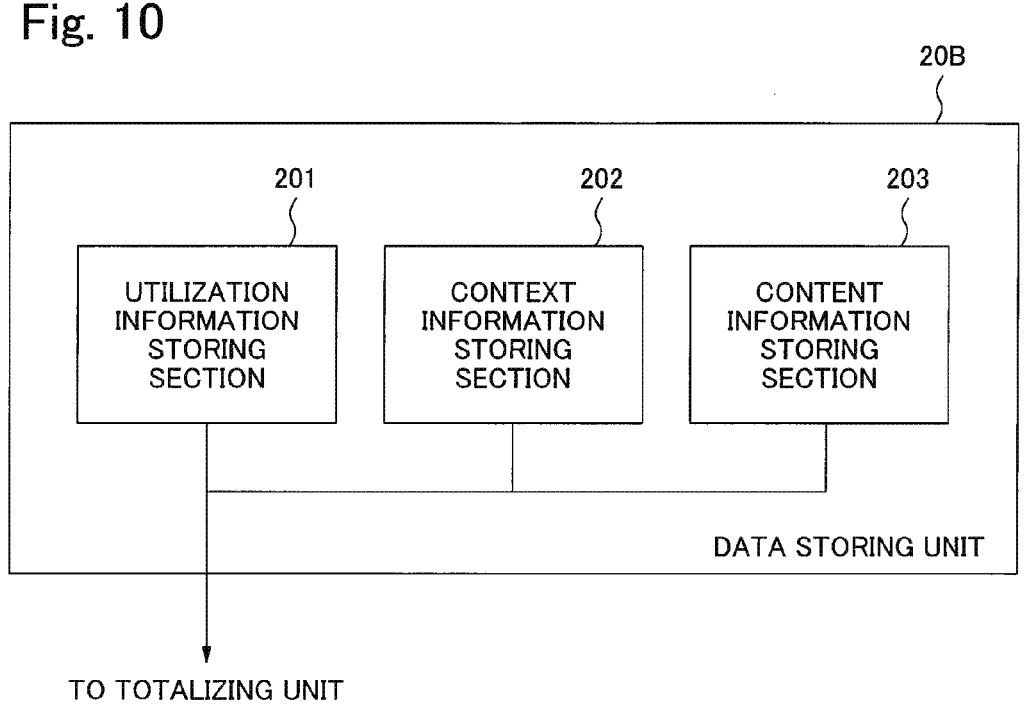
FIG. 10 is a figure showing one example of a configuration of a data storing unit.
FIG. 11 is a figure showing one example of utilization log data.

FIG. 10 is a figure showing one example of a configuration of a data storing unit when the data storing unit separately stores the utilization information data, the context data, and the content attribute data.

A data storing unit 20B shown in FIG. 10 includes a utilization information storing section 201, a context information storing section 202, and a content information storing section 202. The data storing unit 20B stores the utilization information data in the utilization information storing section 201, stores the context data in the context information storing section 202, and stores the content attribute data in the content information storing section 202.

FIG. 11, FIG. 12 and FIG. 13 show examples of the utilization log data, the context data, and the content attribute data, respectively.

The data storing unit 20 shown in FIG. 1 can be replaced with the data storing unit 20B.

The information selection criterion of the content is information which can be used for selecting a specific type of content among a plurality of contents. For example, by selecting the content of which the value of "purpose" in the information selection criteria is "alcoholic beverage", content of a pub can be extracted.

The totalizing unit 12 totalizes the number of utilization times of the content with respect to a combination of all the values that each context can take and all the values that the predetermined information selection criterion can take from the information on the log of content utilization by the user stored in the data storing unit 20. The totalizing unit 12 outputs the totalized result to the context-influence calculating unit 13. The totalizing unit 12 calculates the total with respect to the predetermined information selection criterion. The totalizing unit 12 may calculate the total with respect to all the information selection criteria but the totalizing unit 12 does not necessarily calculate the total with respect to all the information selection criteria. For example, the totalizing unit 12 may calculate the total with respect to one or more information selection criteria selected in advance instead of all the information selection criteria. A configuration in which a user specifies one or more information selection criteria with respect to which the total is calculated by an input unit (not shown) may be used.

When the data storing unit 20 shown in FIG. 1 is replaced with the data storing unit 20B, the totalizing unit 12 may create the information on the content utilization log shown in FIG. 3 from the utilization information data, the context data, and the content attribute data and then, calculate the total. Further, the totalizing unit 12 may directly calculate the total from the utilization information data, the context data, and the content attribute data while responding to a relationship among the data without creating the information on the content utilization log shown in FIG. 3.

The totalizing unit 12 may directly use the total number of utilization times that is calculated as a totalized result. The totalizing unit 12 can perform any process to the total number of utilization times, that is, for example, a normalization process, a process of calculating the ratio of the total number of utilization times that is calculated to the number of all utilization times, a process of calculating the logarithm, or the like. A result obtained by the process can be used as a score and the calculated score can be used as the totalized result. In an example described later, the total number of utilization times is directly used as the score.

The context-influence calculating unit 13 calculates a degree of influence indicating a magnitude of association of each context to the predetermined information selection criterion from the totalized result obtained by the totalizing unit 12. The number of the information selection criteria with respect to which the degree of influence is calculated may be arbitrary (one or more). The information selection criteria with respect to which the degree of influence is calculated may be determined in advance or it may be determined by user's selection by using the input unit (not shown). Further, the totalizing unit 12 does not necessarily calculate the total with respect to all the information selection criteria.

The above-mentioned association means a relationship between two variable quantities, each of which takes one value among a plurality of values. For example, "large association" means that the relationship between two variable quantities described above is great. In this case, a probability that one of two variable quantities takes each of the values is greatly changed according to the value that the other variable quantity takes. On the other hand, "small association" means that the relationship between two variable quantities described above is low. In this case, a probability that one of two variable quantities takes each of the values is not greatly changed even when the value that the other variable quantity takes is changed. Generally, an index indicating the magnitude of the association is called a coefficient of association.

The degree of influence is a value representing a magnitude of influence of a certain context on a certain information selection criterion. Namely, the degree of influence is a value indicating a degree of magnitude of the variation in probability that the value of the certain information selection criterion is selected due to the difference between the values taken by the certain context. The context-influence calculating unit 13 calculates the coefficient of association between the context and the information selection criterion and can use the calculated coefficient of association as the degree of influence.

For example, the context-influence calculating unit 13 calculates the degree of influence of the context on the certain information selection criterion as follows:

First, the context-influence calculating unit 13 arranges the scores of the totalized result obtained with respect to the combination of each of the values of the information selection criterion and each of the values of the context in a matrix shape. Next, the context-influence calculating unit 13 calculates the coefficient of association between the information selection criterion and the context based on the matrix. The context-influence calculating unit 13 takes the calculated coefficient of association as the degree of influence of the context on the information selection criterion.

The context-influence calculating unit 13 can use, for example, Cramer's coefficient of association as the coefficient of association. Further, the context-influence calculating unit 13 can use another coefficient of association such as Yule's coefficient of association or the like. The context-influence calculating unit 13 may use another value as the degree of influence if it is a value representing the magnitude of the influence of the context on the information selection criterion.

The context-influence calculating unit 13 calculates the degree of influence of each context with respect to all the information selection criteria that are targets for the calculation of the degree of influence. The context-influence calculating unit 13 outputs the information on the calculated degree of influence to the information providing unit 30.

The information providing unit 30 presumes and selects pieces of content desired by the user based on the values of the current context (current values) inputted by the user terminal that is a target to which the content is provided and the degrees of influence of each of the current values, and provides the selected pieces of content to the user terminal. The information providing apparatus 1 of the present invention may provide the content in response to the request from the user terminal and may provide the content in spite of the presence or absence of the request from the user terminal. In case the information providing apparatus 1 provides the content in response to the request from the user terminal, the information providing apparatus 1 may receive the values of the current context together with the request for a provision of the content. In the case, the information providing apparatus 1 can take the values of the context when the user terminal requests content to the information providing apparatus 1 as the values of the current context. In case the content is provided in spite of the presence or absence of the request from the user terminal, the information providing apparatus 1 may request the user terminal to transmit the values of the context and receive the values of the context before providing the content. The user terminal may transmit the values of the context to the information providing apparatus 1 in response to the request. In this case, the information providing apparatus 1 can take the values of the context when the user terminal transmits the values of the context as the values of the current context.

The presumption of the content desired by the user is performed by presuming, for example, a value of an information selection criterion of the content desired by the user, which is a value of an attribute type. The information providing unit 30 provides the content to the user by selecting a piece of content which has the presumed value of the information selection criterion from the data storing unit 20 and transmitting it to the terminal (the current terminal) which transmits the values of the context. When plural pieces of content which satisfy the condition exist, the information providing unit 30 may provide the plural pieces of content. When the content which satisfies the condition does not exist, the information providing apparatus 1 may make the user input the condition for information retrieval and perform a search like a conventional information search apparatus. The presumption of the value of the information selection criterion for selecting the content desired by the user can be achieved, for example, by determining the value of the information selection criterion from the current values of the selected context by using a predetermined table or the like. Further, it can be achieved as follows.

As described above, the information providing unit 30 receives the respective degrees of influence that are calculated by the context-influence calculating unit 13. The information providing unit 30 selects the contexts that have large influence on the information selection criterion for selecting the content among the contexts based on the received respective degrees of influence. The information providing unit 30 determines the value of the information selection criterion for selecting the content by using only the current values of the selected contexts. An example of the procedure for determining the value of the information selection criterion is shown below. First, the information providing unit 30 calculates a probability that the user whose context values are the above-mentioned current values accesses the content which has the respective values of the information selection criterion based on the content utilization log. The information providing unit 30 determines the value of the information selection criterion of which the calculated probability is high as the value of the information selection criterion for selecting the content desired by the user.

For example, the information providing unit 30 selects the content having the determined value of the information selection criterion and provides it to the user as follows. First, for example, the information providing unit 30 searches for the content of which the value of the information provision criterion is the above-mentioned determined value from the information on the attribute of the content stored in the data storing unit 20. When the content of which the value of the information provision criterion is the above-mentioned determined value exists, the information providing unit 30 takes the information for specifying the content as a search result. For example, as an example shown in FIG. 13, if the information on the attribute of the content stored in the data storing unit 20 includes the information for specifying the content and the information on the attribute of the content and does not include the utilization log and the information on the context, it is convenient for extraction.

The information providing unit 30 selects the content provided to the user based on the information for specifying the content, which is a search result, and provides it to the user. The information providing unit 30 provides the content to the user by transmitting the selected content to the user terminal used by the user such as a portable terminal or the like.

For example, the content may be stored in the data storing unit 20. In this case, the information providing unit 30 may select the content transmitted to the user from plural pieces of content stored in the data storing unit 20 and transmit it to the user terminal (not shown). Further, the information providing unit 30 may select the content transmitted to the user from plural pieces of content that exist in another content server (not shown). Further, the information providing unit 30 may create the content based on the data stored in the data storing unit 20 or the data in the content server (not shown).

Similarly, the value of the information selection criterion of each piece of content may be stored in the data storing unit 20. The value of the information selection criterion may be stored in a form in which the corresponding contents can be specified. For example, as shown in FIG. 10, all the values of the information selection criterion may be stored in the content information storing section 203 of the data storing unit 20B. The value of the information selection criterion of each piece of content may be stored in a form in which the value is included in the content.

Another existing method can be used instead of the above-mentioned method for selecting and providing the content, which is performed by the information providing unit 30, if the another existing method uses only the values of the context which has large influence on the information selection criterion for selecting the content among the values of the context of the user who is a target to which the information is provided.

Further, the information selection criterion for selecting the content, which is a target for the calculation of the total performed by the totalizing unit 12 and the calculation of the coefficient of association performed by a content-influence calculating unit 13, may be determined in time for the calculation of the total that is performed by the totalizing unit 12. The information selection criterion for selecting the content may be determined in advance or determined by, for example, the input from the user terminal.

Further, the current values of the context may be inputted by the user in advance by using, for example, the input unit (not shown). Among the values of the context, the value which has to be measured by a sensor may be automatically measured by, for example, a sensor included in the user terminal. Among the values of the context, the value which can be acquired without requesting user input, for example, a time or the like, may be automatically acquired.

Next, the operation of the information providing apparatus 1 of the exemplary embodiment will be described in detail with reference to the drawing.

Figure 2:
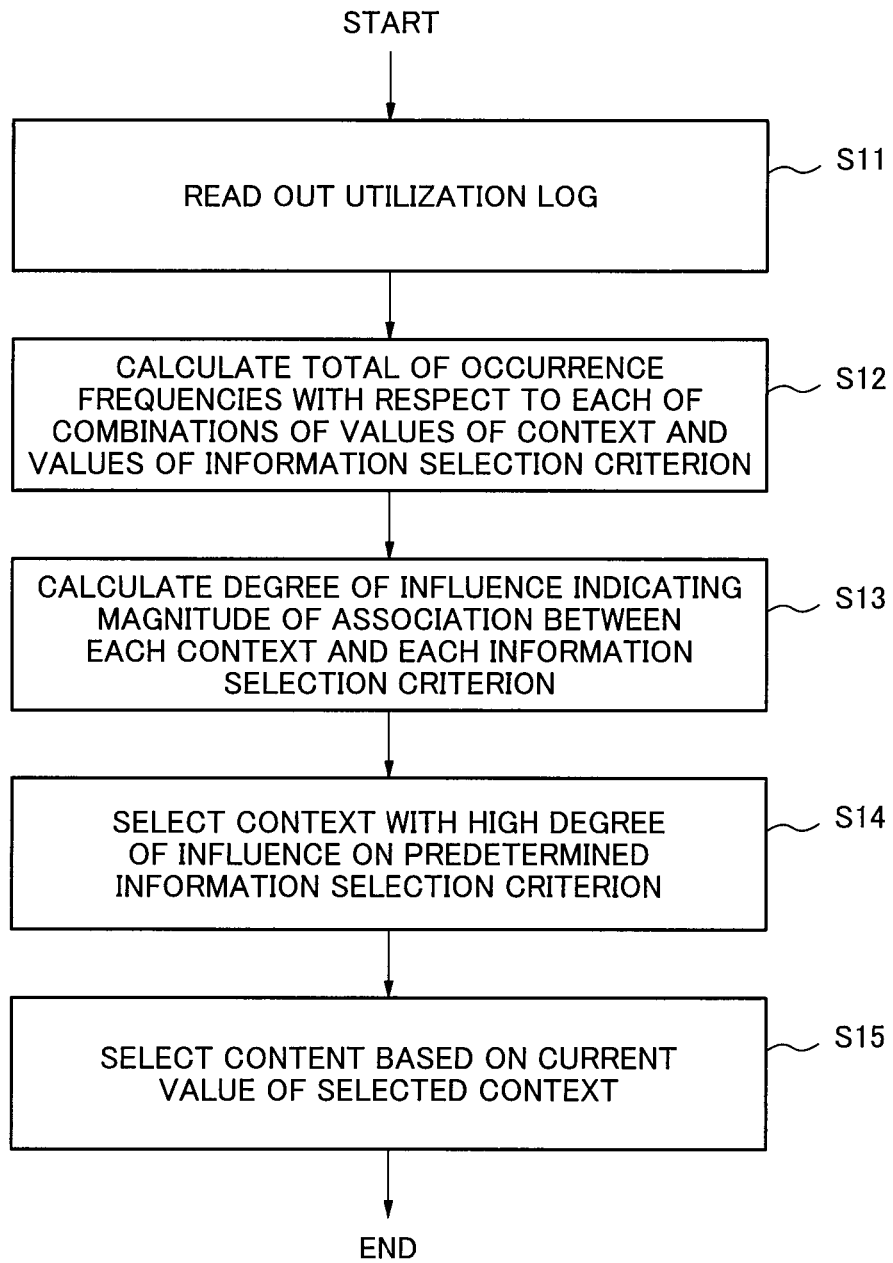
FIG. 2 is a flowchart showing operation of an information providing apparatus according to a first exemplary embodiment.

FIG. 2 is a flowchart showing the operation of the information providing apparatus 1 according to the exemplary embodiment.

For example, when the information providing apparatus 1 receives a request for provision of information from the user via the user terminal (not shown), the information providing apparatus 1 starts the operation. Further, for example, the information providing apparatus 1 may start the operation at the predetermined time in spite of the presence or absence of the request from the user terminal. Furthermore, for example, a configuration in which the user terminal continues to transmit location information of the user terminal, which is intermittently measured by the sensor or the like, to the information providing apparatus 1, and the information providing apparatus 1 starts the operation when the user terminal enters in a predetermined area may be used. When the information selection criterion that is a target to which the degree of influence is calculated by the context-influence calculating unit 13 is not determined in advance, the user terminal transmits the information for designating the information selection criterion that is a target for the calculation of the degree of influence to the information providing apparatus 1. In this case, the information on the designation of the information selection criterion designated by the user is sent to at least the context-influence calculating unit 13. When the information selection criterion that is a target to which the degree of influence is calculated is determined in advance, the request for information provision does not have to include a condition or the like, and may only be the request for information.

Referring to FIG. 2, first, the totalizing unit 12 reads out the utilization log that is the log of content utilization by the user from the utilize record storage unit 20 (step S11).

FIG. 3 is a figure showing a configuration of an example of the utilization log. The utilization log shown in FIG. 3 includes a utilization information part, a context data part, and a content attribute data part. The usage information part includes information for specifying the user who utilizes the content and information for specifying the utilized content. The context data part includes information on the context indicating the user's state at the time of access. The content attribute data part includes information on the attribute of the content accessed by the user. FIG. 3 shows an example of the utilization log and the configuration of the utilization log is not limited to the configuration shown in FIG. 3.

In an example of the utilization log shown in FIG. 3, for example, a first content utilization record (shown in the third row in the table) indicates that a user 01 views a piece of content called as item 01, at 7:00:01 PM on Feb. 1, 2010. The context of the user 01 at the time of viewing indicates that the value of the context "current location" is "area 1" and the value of the context "time zone" is "from 7 p.m. to 8 p.m.". Further, with respect to an attribute type (information selection criterion) of the content "item 01" viewed by the user 01, it is indicated that the value of the information selection criterion "purpose" is "alcoholic beverage" and the value of the information selection criterion "area" is "area 1".

Next, the totalizing unit 12 totals the number of utilization times of the content by the user for each combination of each of the values that the respective contexts take and each of the values that the respective information selection criteria, which are the targets to which a total value is calculated, take (step S12). The totalizing unit 12 performs a predetermined process to each of the numbers of utilization times obtained by calculating the total and calculates a score. The totalizing unit 12 may directly use each of the numbers of utilization times as the score without performing the process to each of the numbers of utilization times, which is the totalized result. The totalizing unit 12 outputs the data of the totalized result to the context-influence calculating unit 13.

FIG. 4 is a figure showing an example of the totalized result calculated by the totalizing unit 12. FIG. 4 is an example in which the number of utilization times is directly used as the score. For example, first data (the second row in the table) of the totalized result shown in FIG. 4 indicates that the user of which the value of the context "current location" is "area 1" utilizes the content of which the value of the information selection criterion "purpose" is "alcoholic beverage" 12 times.

Next, the context-influence calculating unit 13 calculates the degree of influence indicating the magnitude of the association between each context and each information selection criterion from the totalized result outputted by the totalizing unit 12 (step S13). As mentioned above, the context-influence calculating unit 13 may calculate the coefficient of association between a certain context and a certain information selection criterion as follows.

First, the context-influence calculating unit 13 arranges each value of each context, each value of each information selection criterion, and the score of the totalized result with respect to the combination of these values in a matrix. For example, the context-influence calculating unit 13 may create one matrix in which one totalized result is indicated with respect to a combination of one context and one information selection criterion.

In FIG. 5, the scores that are calculated as the totalized result are arranged in a matrix form. FIG. 5 shows an example of the totalized result with respect to a combination of each of the values of "current area" that is one of the contexts and each of the values of "purpose" that is one of the information selection criteria. In the example shown in FIG. 5, the row headings "area 1", "area 2", "area 3", and "area 4" correspond with "current area" that is one of the contexts in the matrix. Further, the column headings "alcoholic beverage", "cafe", "daily meal", "meal before a bout", and "entertainment" correspond with "purpose" that is one of the information selection criteria in the matrix. In the example shown in FIG. 5, the value "12" described in the most upper left entry of the matrix means that the user of which the value of the context "current location" is "area 1" utilizes the content of which the value of the information selection criterion "purpose" is "alcoholic beverage" 12 times.

The context-influence calculating unit 13 calculates the coefficient of association between the context and the information selection criterion from the score of the totalized result with respect to the combination of each value of the context and each value of the information selection criterion that are shown in a matrix. As mentioned above, the coefficient of association calculated by the context-influence calculating unit 13 is, for example, Cramer's coefficient of association, Yule's coefficient of association, or another coefficient of association.

FIG. 6 is a figure showing an example of the calculated coefficient of association. In an example shown in FIG. 6, the value of each entry is the coefficient of association between each value in the column heading which corresponds with the information selection criterion and each value in the row heading which corresponds with the context. For example, the value of each entry in the column "purpose" is the coefficient of association between the information selection criterion "purpose" and each of the contexts. In the example shown in FIG. 6, for example, the value "0.2" described in the most upper left entry means that the coefficient of association between the information selection criterion "area" and the context "age" is 0.2.

The context-influence calculating unit 13 takes the calculated coefficient of association as the degree of influence of the context corresponding to the coefficient of association on the information selection criterion corresponding to the coefficient of association.

FIG. 7 is a figure showing an example of the degree of influence of each of the contexts on the information selection criteria. In FIG. 7, the degree of influence on the information selection criterion "purpose" is shown and the degree of influence on the other information selection criteria is omitted. However, FIG. 7 includes the degree of influence on the other information selection criteria, for example, "area", "ranking", and the like.

The context-influence calculating unit 13 outputs the calculated degree of influence to the information providing unit 30.

The information providing unit 30 selects the context with high degree of influence on the predetermined information selection criterion (step S14).

Next, the information providing unit 30 presumes the value of the information selection criterion based on the selected context with high degree of influence and selects the context provided to the user based on the value of the presumed information selection criterion (step S15). The presumption of the value of the information selection criterion performed by the information providing unit 30 may be performed by using a method described later or another known method.

The information providing apparatus 1 according to the exemplary embodiment and an information providing apparatus according to another exemplary embodiment described later can be realized by using a computer and a program which controls the computer.

The exemplary embodiment has an effect in which information desired by a user can be selected with high accuracy and provides to the user at a low processing cost.

The reason is because the information providing apparatus 1 according to the exemplary embodiment calculates the degree of influence indicating the magnitude of the influence of each piece of the context on the information selection criterion for selecting the information. Because the information providing apparatus 1 according to the exemplary embodiment calculates the above-mentioned degree of influence, an information presentation unit can use only the context with high degree of influence on the information selection criterion for presuming the value of the information selection criterion for the selection of information. As a result, a bad influence on the presumed result of the value of the information selection criterion by the context with small degree of influence on the information selection criterion can be avoided.

In the above explanation, the totalizing unit 12 calculates a total for each context. And, the context-influence calculating unit 13 calculates the degree of influence of each context. However, the totalizing unit 12 may make a combination of two or more contexts to create a new context (combination context) in addition to the existing context and calculate a total. In this case, for example, the totalizing unit 12 may use the combination of the contexts determined in advance as the new context. Further, the context-influence calculating unit 13 may calculate the degree of influence of the combination context on the information selection criterion like the degree of influence of the context on the information selection criterion. Further, the information providing unit 30 may treat the combination context like the context. In other words, the combination context can be included in the above-mentioned context.

However, when the value of the degree of influence of the combination context is greater than the value of the degree of influence of each context included in the combination context, the context-influence calculating unit 13 eliminates the degree of influence of each context included in the combination context. Further, when the value of the degree of influence of the combination context is smaller than the value of the degree of influence of any one of the contexts included in the combination context, the context-influence calculating unit 13 eliminates the degree of influence of the combination context. For example, the context-influence calculating unit 13 may eliminate the degree of influence by replacing the value of the degree of influence with a value (for example, 0) that shows the least influence or deleting the value of the degree of influence. The elimination of the degree of influence performed by the context-influence calculating unit 13 may be performed so that the context of which the degree of influence is eliminated is not selected by the information providing unit 30 as the context that has large influence on the information selection criterion.

The information providing unit 30 selects the context which has large influence on the information selection criterion from each context based on the degree of influence that is calculated by the context-influence calculating unit 13. However, as mentioned above, the context of which the degree of influence is eliminated is not selected as the context that has large influence on the information selection criterion. The information providing unit 30 further determines the value of the information selection criterion based on the current value of the selected context. The information providing unit 30 selects content based on the value of the determined information selection criterion and provides it to the user terminal (not shown).

Second Exemplary Embodiment

Next, an information providing system according to a second exemplary embodiment of the present invention will be described in detail with reference to the drawing.

Figure 8:
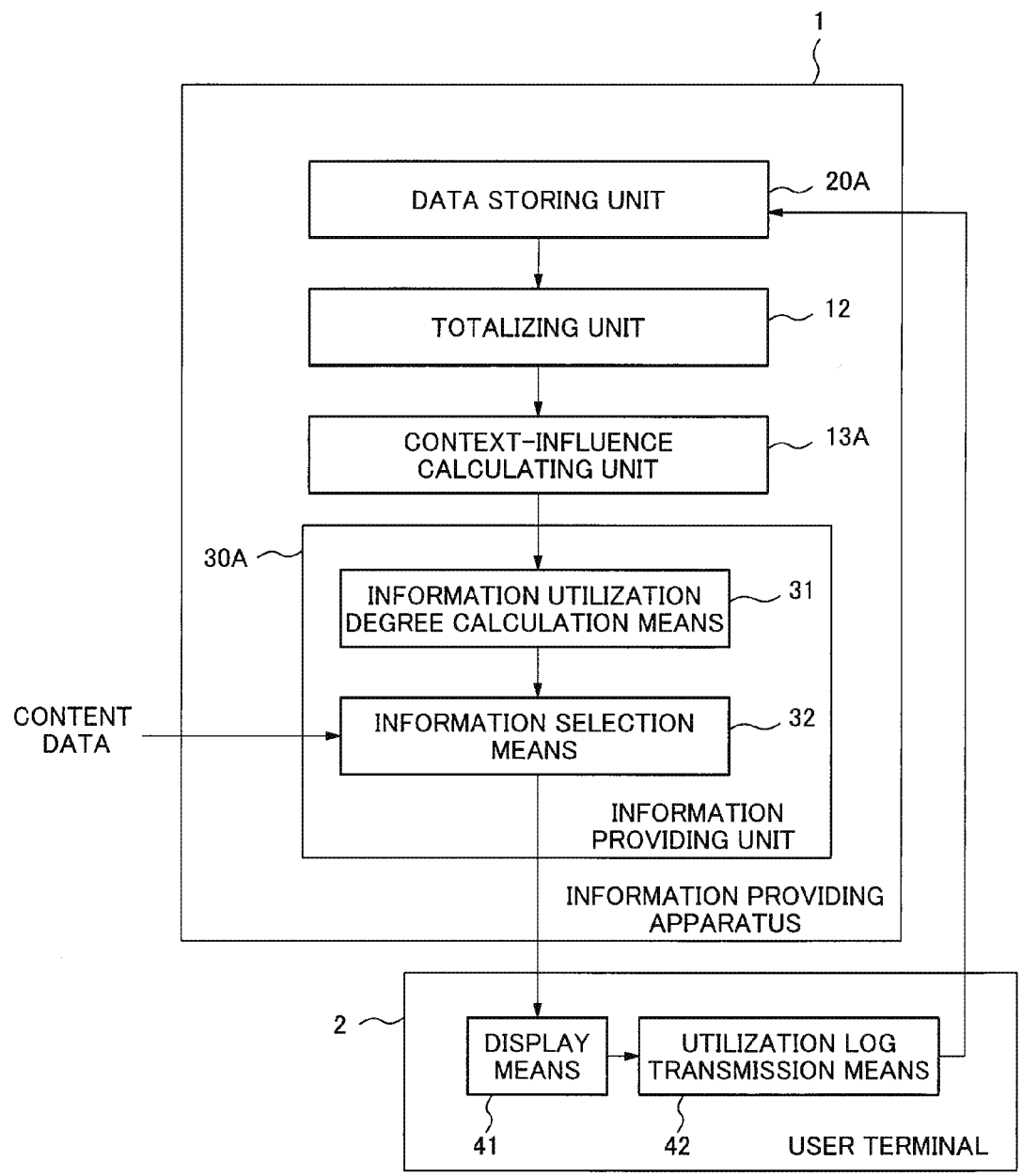
FIG. 8 is a block diagram showing a configuration of an information providing system according to a second exemplary embodiment.

FIG. 8 is a figure showing a configuration of the information providing system of the exemplary embodiment.

Referring to FIG. 8, the information providing system of the exemplary embodiment includes an information providing apparatus 1A and a user terminal 2. The information providing apparatus 1A of the exemplary embodiment includes a data storing unit 20A, the totalizing unit 12, a context-influence calculating unit 13A, and an information providing unit 30A including an information utilization degree calculation unit 31 and an information selection unit 32. The user terminal 2 includes a display unit 41 and a utilization log transmission unit 42. For ease of explanation, although only one user terminal 2 is described in FIG. 9, the number of user terminals is not limited to one and a plurality of user terminals can be used. Further, the data storing unit 20A may have a configuration that is the same as that of the data storing unit 20B shown in FIG. 10.

The information providing apparatus 1A of this example includes the information providing unit 30A that includes the information utilization degree calculation unit 31 and the information selection unit 32. This is a difference between the information providing apparatus 1A of this example and the information providing apparatus 1 described in FIG. 1. Further, the data storing unit 20A receives the data of the utilization log from the utilization log transmission unit 42 of the user terminal 2. This is a difference between the information providing apparatus 1A and the information providing apparatus 1. The information on the degree of influence that is outputted to the information providing unit 30A by the context-influence calculating unit 13A is inputted to the information utilization degree calculation unit 31 of the information providing unit 30A.

Hereinafter, the explanation is focused on the difference between the information providing apparatus 1 of the first exemplary embodiment shown in FIG. 1 and the information providing apparatus 1A of the second exemplary embodiment. The totalizing unit 12 of the information providing apparatus 1A of the second exemplary embodiment is the same as the totalizing unit 12 of the information providing apparatus 1 of the first exemplary embodiment. Therefore, the explanation will be omitted.

A process of calculating the degree of influence performed by the context-influence calculating unit 13A of the second exemplary embodiment is same as the process of calculating the degree of influence performed by the context-influence calculating unit 13 of the information providing apparatus 1 of the first exemplary embodiment. Therefore, the explanation of calculating the degree of influence will be omitted. The context-influence calculating unit 13A outputs the calculated degree of influence to the information utilization degree calculation unit 31.

The information utilization degree calculation unit 31 calculates a utilization degree that is a degree of tendency of utilization by the user to which information is presented for each value that the predetermined information selection criterion can take based on the information on the degree of influence that is received from the context-influence calculating unit 13A. The information selection criteria with respect to which the information utilization degree calculation unit 31 calculates the utilization degree are all or a part of the information selection criteria with respect to which the totalizing unit 12 calculates the total of the number of utilization times of the content. The information selection criterion that is a target with respect to which the utilization degree is calculated may be determined in advance or may be selected by the user by using the input unit (not shown).

For example, the information utilization degree calculation unit 31 calculates the utilization degree as follows.

First, the information utilization degree calculation unit 31 selects the context that has large influence on the predetermined information selection criterion based on the information on the degree of influence that is received from the context-influence calculating unit 13A, by using the predetermined method. For example, the information utilization degree calculation unit 31 may select a predetermined number of the contexts that have large influence on the predetermined information selection criterion based on the calculated degree of influence in decreasing order of the degree of influence. Further, for example, the information utilization degree calculation unit 31 may select the context of which the degree of influence is equal to or greater than the predetermined threshold value. The information utilization degree calculation unit 31 may calculate a ratio of the degree of influence of each content to the maximum value of the calculated degree of influence and select the context of which the calculated ratio is equal to or greater than the predetermined threshold value. Further, the information utilization degree calculation unit 31 can perform the selection by using another existing method.

Next, the information utilization degree calculation unit 31 calculates the utilization degree for each value that the predetermined information selection criterion of the content can take based on the current value of the above-mentioned context selected by the user who is a target to which the content is provided by the information providing apparatus 1A. The utilization degree is a value indicating a degree of possibility with which the user utilizes the content. The utilization degree is, for example, a probability calculated based on the log of the past utilization. The utilization degree will be described in detail later. Another value having a correlation with the probability based on the log of the past utilization, for example, a value expressed by a right side of the equation 2 may be used as the utilization degree. The log of the past utilization is not limited to the log of the utilization by the user who is a target to which the content is presented. It may be the log of the utilization by a large number of users. Further, the log of the past utilization may be the log of the utilization stored in the data storing unit 20 or the log of the utilization that is collected by using another method.

$C1j1, C2j2, \ldots$, and $Cnjn$ in the equation 1 are current values of the context selected by the information utilization degree calculation unit 31 among the contexts of the user who is a target to which the context is provided. $Gi$ ($i=1, \ldots$, and $N$) is a value that the predetermined information selection criterion can take. $N$ is the number of values that the above-mentioned predetermined attribute type can take, and $n$ is the number of the selected contexts. In this case, a probability that the user selects the content of which the value of the above-mentioned predetermined information selection criterion is $Gi$ is calculated by using the equation 1. When the above-mentioned probability is used as the utilization degree, the information utilization degree calculation unit 31 uses the value calculated by the equation 1 as the utilization degree when the value of the information selection criterion is $Gi$.

$$P(G_i \mid C_{1j_1}, C_{2j_2}, \ldots, C_{nj_n}) = \frac{P(G_i) \prod_{k=1}^{n} P(C_{kj_k} \mid G_i)}{\prod_{k=1}^{n} P(C_{kj_k})} \quad \text{[Equation 1]}$$

The equation 1 is an equation representing the utilization degree with respect to an i-th value of one predetermined information selection criterion. When the utilization degree is calculated with respect to a plurality of information selection criteria, the information utilization degree calculation unit 31 similarly calculates the utilization degree with respect to each value of each information selection criterion. However, the values of $N$ and $n$ mentioned above are determined with respect to each information selection criterion. Therefore, these values are not necessarily the same as each other with respect to all the information selection criteria.

The information utilization degree calculation unit 31 may directly calculate the value of the left side of the equation 1 from, for example, the log of the past utilization. Further, the information utilization degree calculation unit 31 may calculate the value of the left side of the equation 1 by substituting a value of each probability of which the right side of the equation 1 is composed that is calculated from, for example, the log of the past utilization in advance into the right side of the equation 1.

The denominator of the right side of the equation 1 is a value determined by $C1j1, \ldots$, and $Cnjn$ and it is not determined by $Gi$. Accordingly, the information utilization degree calculation unit 31 may use a value calculated by the right side of an equation 2 that is a value of the numerator of the right side of the equation 1 as the utilization degree. Further, the information utilization degree calculation unit 31 may calculate the utilization degree by using another existing method for calculating a value indicating a degree of possibility without using the value calculated by the right side of the equation 1 or the equation 2.

$$P(G_i \mid C_{1j_1}, C_{2j_2}, \ldots, C_{nj_n}) \propto P(G_i) \prod_{k=1}^{n} P(C_{kj_k} \mid G_i) \quad \text{[Equation 2]}$$

The information utilization degree calculation unit 31 calculates the utilization degree with respect to all the values of all the information selection criteria that are calculation targets of the utilization degree and transmits information on the calculated utilization degree to the information selection unit 32.

The information selection unit 32 selects content with high possibility of being used by the user as the content provided to the user based on the utilization degree that is received from the information utilization degree calculation unit 31 by using a selection method described below and transmits it to the user terminal 2.

For example, the information selection unit 32 selects the content having the value with the highest possibility of being used by the user as the value of the information selection criterion among the values of the predetermined one or more information selection criteria based on the received utilization degree as the content to be transmitted to the user. Further, the information selection unit 32 may select two or more values among the values of the predetermined one or more information selection criteria in decreasing order of the possibility of being used by the user and select the content that has any one of the selected values as the value of the information selection criterion as the content to be transmitted to the user. When plural pieces of content that meet the condition exist, the information selection unit 32 may provide the plural pieces of content. When no content that meets the condition exists, the information providing apparatus 1A may make the user input a condition for information search and carry out the search like a conventional information search apparatus.

As described above, for example, the content can be stored in the data storing unit 20. In this case, the information selection unit 32 may select the content to be transmitted to the user from the plural pieces of content stored in the data storing unit 20 and transmit it to the user terminal 2. The information selection unit 32 may select the content to be transmitted to the user from the plural pieces of content which exist in another content server (not shown). Further, the information selection unit 32 may create the content based on the data stored in the data storing unit 20 or the data that exists in the content server (not shown).

The user terminal 2 includes the display unit 41 and the utilization log transmission unit 42. For example, the user terminal 2 can be realized by using a computer, a portable terminal, or the like that is connected to the information providing apparatus 1A via a network so as to be capable of communication.

The user terminal 2 displays the content received from the information providing apparatus 1A in the display unit 41 such as a display or the like to the user by using a software program, such as a browser or the like. The user selects the content that the user wants to see from the contents displayed in the display unit 41 by using the input unit (not shown) or the like and views it. The user utilizes the content in such a way.

When the user utilizes the displayed content, the utilization log transmission unit 42 acquires the information on the utilization log and transmits it to the information providing apparatus 1A.

The utilization record transmitted by the utilization log transmission unit 42 is acquired by using an arbitrary existing method and recorded in the user terminal 2 when, for example, the user accesses the content by using the user terminal 2. However, it is not necessary for the user terminal 2 to transmit all the information on the utilization log. For example, a configuration in which the user terminal 2 transmits the user's context information acquired by making the user perform input at the time of utilizing the content and another apparatus records and transmits information other than the context information may be used. The information providing apparatus 1A that receives the information on the utilization log stores the received utilization log in the data storing unit 20A.

Next, the operation of the exemplary embodiment will be described in detail with reference to the drawing.

Figure 9:
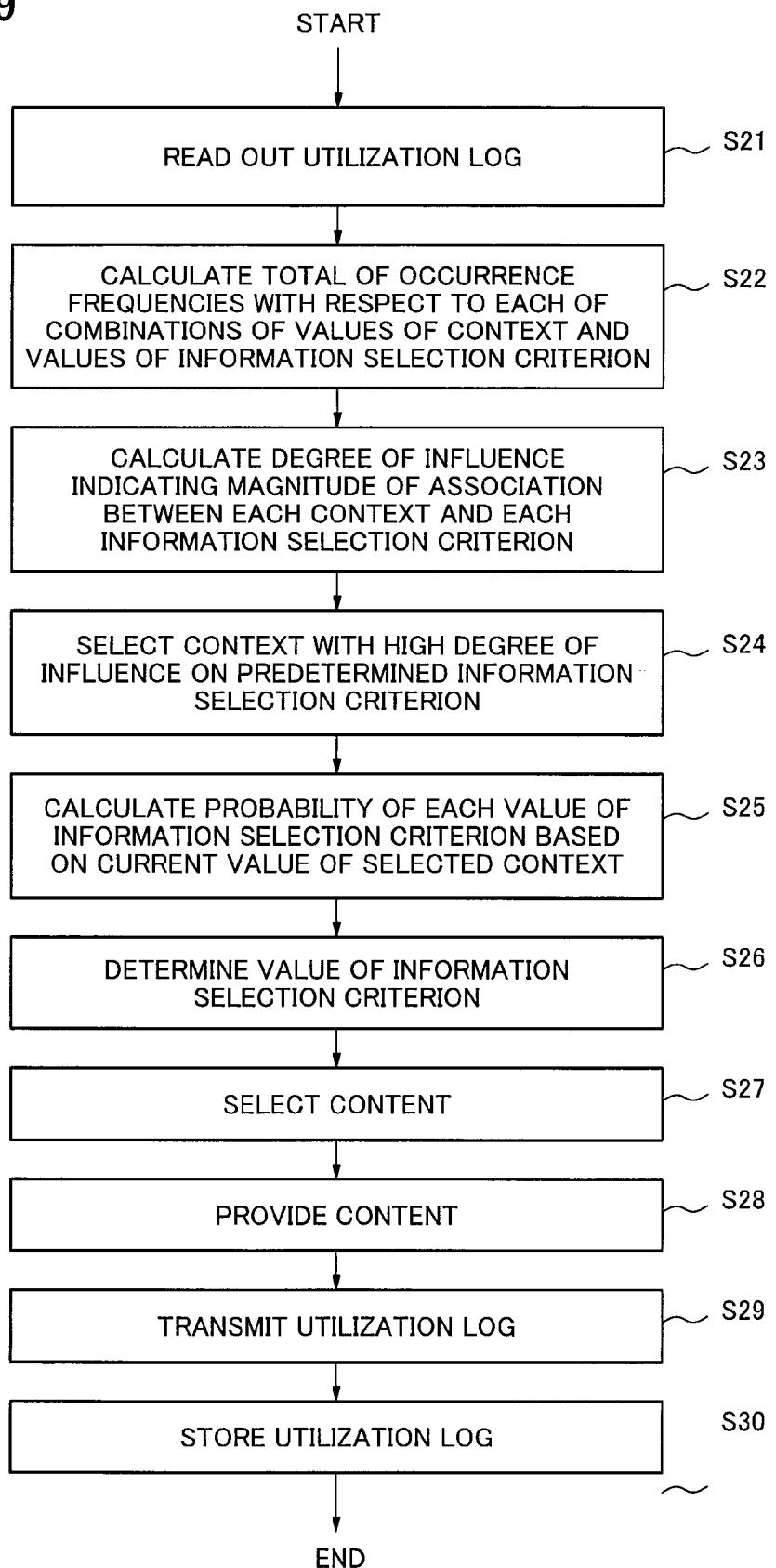
FIG. 9 is a flowchart showing operation of an information providing system according to a second exemplary embodiment.

FIG. 9 is a flowchart showing the operation of the exemplary embodiment.

The processes from step S21 to step S24 shown in FIG. 9 are the same as the processes from step S11 to step S14 in the operation of an information recommendation apparatus according to the first exemplary embodiment shown in FIG. 2. Therefore, the explanation of these processes will be omitted.

The information utilization degree calculation unit 31 selects the context that has large influence on the predetermined information selection criterion based on the received information on the degree of influence by using the predetermined method. The information utilization degree calculation unit 31 calculates the utilization degree with respect to each of the values that the information selection criterion can take based on the value of the selected context among the current contexts of the user who is a target to which the information is provided (step S25). When a plurality of information selection criteria, with respect to which the utilization degree is calculated, exist, the utilization degree is individually calculated with respect to each information selection criterion. The following explanation is an example for explaining the operation of the calculation of the utilization degree.

In the following example, the information utilization degree calculation unit 31 selects three contexts in decreasing order of the degree of influence on the predetermined information selection criterion as the context that has large influence on the information selection criterion. Further, the target information selection criterion with respect to which the utilization degree is calculated and the utilization degree of each value is calculated is "purpose". The values that the information selection criterion "purpose" can take are "alcoholic beverage", "cafe", "daily meal", "meal before a bout", and "entertainment". The information utilization degree calculation unit 31 selects the context that has large influence on the information selection criterion "purpose" based on the degree of influence shown in FIG. 7. In this case, the information utilization degree calculation unit 31 selects "time zone (degree of influence is 0.8)", "next presumption area (degree of influence is 0.7)", and "current area (degree of influence is 0.6)" as the context that has large influence on the information selection criterion "purpose".

In the above-mentioned case, because the number of the selected contexts is 3, n=3 is used for n in the equation 1. $C1_j1$, $C2_j2$, and $C3_j3$ are the value of "time zone", the value of "next presumption area", and the value of "current area", respectively. G1, G2, G3, G4, and G5 are "alcoholic beverage", "cafe", "daily meal", "meal before a bout", and "entertainment", which are the values that the information selection criterion "purpose" can take, respectively.

For example, when the value $C1_j1$ of "time zone" is "from 7 p.m. to 8 p.m.", the value $C2_j2$ of "next presumption area" is "Shinbashi", and the value $C3_j3$ of "current area" is "Shinagawa", the probabilities Gi (i=1 to 5) are calculated by the equation 1 as follows.

P (G1=alcoholic beverage|$C1_j1$=7 PM, $C2_j2$=Shinbashi, $C3_j3$=Shinagawa)=0.7

P (G2=daily meal|$C1_j1$=7 PM, $C2_j2$=Shinbashi, $C3_j3$=Shinagawa)=0.2

P (G3=meal before a bout|$C1_j1$=7 PM, $C2_j2$=Shinbashi, $C3_j3$=Shinagawa)=0.1

P (G4=cafe|$C1_j1$=7 PM, $C2_j2$=Shinbashi, $C3_j3$=Shinagawa)=0.0

P (G5=entertainment|$C1_j1$=7 PM, $C2_j2$=Shinbashi, $C3_j3$=Shinagawa)=0.0

When the probability calculated by the equation 1 is used as the utilization degree, these values are the utilization degrees. When the utilization degree is calculated with respect to the information selection criterion other than the information selection criterion "purpose", the probability is calculated with respect to each of the values that the information selection criterion can take by using the equation 1 and the calculated probability is used as the utilization degree.

The information utilization degree calculation unit 31 transmits the information on the calculated utilization degree to the information selection unit 32.

The information selection unit 32 selects the content by using the predetermined criterion based on the information on the utilization degree received from the information utilization degree calculation unit 31 (step S26) and transmits the data of the selected content to the user terminal 2 in order to provided it to the user (step S27).

For example, it is assumed that the information selection unit 32 selects and displays only the content which has the value of the information selection criterion with respect to which the value of the utilization degree is the maximum as the value of the attribute type. In the above-mentioned example of the utilization degree, the value of the utilization degree is the maximum when the value of the information selection criterion "purpose" is "alcoholic beverage". In this case, the information selection unit 32 selects the content of which the value of the information selection criterion "purpose" is "alcoholic beverage" as the content presented to the user.

The user utilizes the content displayed in the display unit 41 of the user terminal 2 (step S28).

The utilization log transmission unit 42 transmits the information on the record of the content utilization by the user to the information providing apparatus 1A (step S29).

The data storing unit 20A of the information providing apparatus 1A stores the information on the content utilization record received from the utilization log transmission unit 42 of the user terminal 2 (step S30).

The exemplary embodiment has an effect in which the accuracy of the selection of the information provided to the user can be improved in addition to the effect of the first exemplary embodiment.

The reason is because the information utilization degree calculation unit 31 according to the exemplary embodiment selects the content by using the utilization degree representing the degree of possibility of the user utilization, which is calculated for each value of the attribute type of the content based on the value of the current context of the user who is a target to which the content is provided.

The present invention has been explained with reference to the exemplary embodiment described above. The present invention is not limited to the above-mentioned exemplary embodiment. Various changes in the configuration or details of the invention of the present application that can be understood by those skilled in the art can be made without departing from the scope of the invention.

This application claims priority based on Japanese Patent Application No. 2010-143684 filed on Jun. 24, 2010, the disclosure of which is hereby incorporated by reference in its entirety.

INDUSTRIAL APPLICABILITY

The present invention can be applied to a field of information recommendation and information search for providing the appropriate content according to a user and a user' status.

DESCRIPTION OF SYMBOLS 1, 1A information providing apparatus
2 user terminal
12 totalizing unit
13, 13A context-influence calculating unit
20, 20A, 20B data storing unit
30, 30A information providing unit
31 information utilization degree calculation unit
32 information selection unit
41 display unit
42 utilization log transmission unit

The invention claimed is:

1. An information providing apparatus comprising:
a data storing unit which stores therein utilization log data that includes a plurality of sets of a plurality of context values inputted from one of a plurality of user terminals upon accessing a piece of content, and one or more information selection criterion values for the piece of content;
a totalizing unit which totalizes frequencies of accesses to pieces of content, from the utilization log data, for each of the combinations of the values that each of the contexts can take and the values that each of the information selection criteria can take;
a context-influence calculating unit which calculates a coefficient of association between each of the information selection criteria and each of the contexts, from the result of the totalization conducted by the totalizing unit, and outputting the result to an information providing unit; and
the information providing unit which selects n [h] pieces (n [h] is one or more, and h is 1 to m, which is a number of the pieces of the information selection criteria and is one or more) of contexts in priority from those having higher association with each of m pieces of information selection criteria, on the basis of the coefficient of association, and selects, on the basis of values of the n [h] pieces of contexts, which are current values, inputted from one of the user terminals, which is a current terminal, a piece of content to be outputted to the current terminal.

2. The information providing apparatus described in claim 1, wherein
the data storing unit which stores content, and
the information providing unit calculates, for each of the m pieces of information selection criteria, an occurrence probability of each of the values that the information selection criterion can take, on the basis of the current values of the selected n [h] pieces of contexts, selects p [h] pieces (p [h] is one or more) of values, which are high probability information selection criterion values [h], in priority from those having higher occurrence probability, and selects, on the basis of all the selected high probability information selection criterion values, a piece of the content from the data storing unit.

3. An information providing system including:
the information providing apparatus described in claim 1; and
one or more of the plurality of the user terminals comprising:
a display unit which displays information on the content selected by the information providing unit.

4. The information providing apparatus described in claim 1, wherein the coefficient of association is Cramer's coefficient of association or Yule's coefficient of association.

5. The information providing apparatus described in claim 4, wherein the coefficient of association indicates a magnitude of an association between each of the information selection criteria and each of the contexts.

6. The information providing apparatus described in claim 4, wherein the coefficient of association comprises an index that indicates a magnitude of an association between each of the information selection criteria and each of the contexts.

7. The information providing apparatus described in claim 1, wherein the coefficient of association indicates a magnitude of an association between each of the information selection criteria and each of the contexts.

8. The information providing apparatus described in claim 1, wherein the coefficient of association comprises an index that indicates a magnitude of an association between each of the information selection criteria and each of the contexts.

9. An information providing method comprising:
storing, in a data storing unit, utilization log data that includes a plurality of sets of a plurality of context values inputted from one of a plurality of user terminals upon accessing a piece of content, and one or more information selection criterion values for the piece of content,
totalizing frequencies of accesses to pieces of content, from the utilization log data, for each of the combinations of the values that each of the contexts can take and the values that each of the information selection criteria can take, calculating a coefficient of association between each of the information selection criteria and each of the contexts, from the result of the totalization conducted, and selecting n [h] pieces (n [h] is one or more, and h is 1 to m, which is a number of the pieces of the information selection criteria and is one or more) of contexts in priority from those having higher association with each of m pieces (m is one or more) of information selection criteria, on the basis of the coefficient of association, and selecting, on the basis of values of the n [h] pieces of contexts, which are current values, inputted from one of the user terminals, which is a current terminal, a piece of content to be outputted to the current terminal.

10. The information providing method described in claim 9, comprising:
storing content in the data storing unit; and
calculating, for each of the m pieces of information selection criteria, an occurrence probability of each of the values that the information selection criterion can take, on the basis of the current values of the selected n [h] pieces of contexts, selecting p [h] pieces (p [h] is one or more) of values, which are high probability information selection criterion values, in priority from those having higher occurrence probability, and selecting a piece of the content from the data storing unit on the basis of all the selected high probability information selection criterion values.

11. The information providing method described in claim 9, wherein the coefficient of association is Cramer's coefficient of association or Yule's coefficient of association.

12. A non-transitory computer readable medium storing an information providing program which causes a computer to function as:
a data storing unit which stores therein utilization log data that includes a plurality of sets of a plurality of context values inputted from one of a plurality of user terminals upon accessing a piece of content, and one or more information selection criterion values for the piece of content,
a totalizing unit which stores frequencies of accesses to pieces of content, from the utilization log data, for each of the combinations of the values that each of the contexts can take and the values that each of the information selection criteria can take,
a context-influence calculating unit which calculates the coefficient of association between each of the information selection criteria and each of the contexts, from the result of the totalization conducted by the totalizing unit, and outputting the result to an information providing unit, and
the information providing unit which selects n [h] pieces (n [h] is one or more, and h is 1 to m, which is a number of the pieces of the information selection criteria and is one or more) of contexts in priority from those having higher association with each of m pieces (m is one or more) of information selection criteria, on the basis of the coefficient of association, and selects, on the basis of values of the n [h] pieces of contexts, which are current values, inputted from one of the user terminals, which is a current terminal, a piece of content to be outputted to the current terminal.

13. The non-transitory computer readable medium described in claim 12, storing an information providing program which causes a computer to function as
the data storing unit which stores content, and
the information providing unit which calculates, for each of the m pieces of information selection criteria, an occurrence probability of each of the values that the information selection criterion can take, on the basis of the current values of the selected n [h] pieces of contexts, selects p [h] pieces (p [h] is one or more) of values, which are high probability information selection criterion values), in priority from those having higher occurrence probability, and selects, on the basis of all the selected high probability information selection criterion values, a piece of the content from the data storing unit.

14. The non-transitory computer readable medium described in claim 12, wherein the coefficient of association is Cramer's coefficient of association or Yule's coefficient of association.

15. An information providing apparatus comprising:
a data storing means for storing therein utilization log data that includes a plurality of sets of a plurality of context values inputted from one of a plurality of user terminals upon accessing a piece of content, and one or more information selection criterion values for the piece of content;
a totalizing means for totalizing frequencies of accesses to pieces of content, from the utilization log data, for each of the combinations of the values that each of the contexts can take and the values that each of the information selection criteria can take;
a context-influence calculating means for calculating a coefficient of association between each of the information selection criteria and each of the contexts, from the result of the totalization conducted by the totalizing means, and outputting the result to an information providing means; and
the information providing means for selecting n [h] pieces (n [h] is one or more, and h is 1 to m, which is a number of the pieces of the information selection criteria and is one or more) of contexts in priority from those having higher association with each of m pieces of information selection criteria, on the basis of the coefficient of association, and selecting, on the basis of values of the n [h] pieces of contexts, which are current values, inputted from one of the user terminals, which is a current terminal, a piece of content to be outputted to the current terminal.

16. The information providing apparatus described in claim 15, wherein the coefficient of association is Cramer's coefficient of association or Yule's coefficient of association.

* * * * *